(12) United States Patent
Nakaoka et al.

(10) Patent No.: US 11,027,601 B2
(45) Date of Patent: Jun. 8, 2021

(54) SHADE ROLLER APPARATUS

(71) Applicant: Webasto SE, Stockdorf (DE)

(72) Inventors: Takeshi Nakaoka, Hiroshima (JP); Yosuke Yamamoto, Hiroshima (JP)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 16/639,460

(22) PCT Filed: Aug. 21, 2018

(86) PCT No.: PCT/EP2018/072541
§ 371 (c)(1),
(2) Date: Feb. 14, 2020

(87) PCT Pub. No.: WO2019/042822
PCT Pub. Date: Mar. 7, 2019

(65) Prior Publication Data
US 2021/0129638 A1    May 6, 2021

(30) Foreign Application Priority Data

Aug. 31, 2017 (JP) .............................. JP2017-167071

(51) Int. Cl.
*B60J 3/02* (2006.01)
*B60J 7/00* (2006.01)
*B60J 1/20* (2006.01)

(52) U.S. Cl.
CPC ........... *B60J 7/0015* (2013.01); *B60J 1/2044* (2013.01)

(58) Field of Classification Search
CPC .............................. B60J 7/0015; B60J 1/2044

USPC .......................................... 296/214; 160/402
See application file for complete search history.

(56) References Cited

U.S. PATENT DOCUMENTS 1,021,555 A   *   3/1912   Purat ...................... A47H 23/01
                                                           160/393
2014/0132026 A1      5/2014   Broeren et al.

FOREIGN PATENT DOCUMENTS

| DE | 202007008187 U1 | 6/2007 |
| EP | 2708392 A1 | 3/2014 |
| EP | 2730441 A1 | 5/2014 |
| JP | 2002054369 A | 2/2002 |

OTHER PUBLICATIONS

International Search Report for PCT/EP2018/072541 dated Oct. 30, 2018 in English (3 pages).

* cited by examiner

*Primary Examiner* — Dennis H Pedder
(74) *Attorney, Agent, or Firm* — Fitch, Even, Tabin & Flannery, LLP

(57) ABSTRACT

A shade roller apparatus is provided to achieve stable attachment of a pull bar to a shading sheet, and reduce the numbers of components and process steps required for the attachment. The pull bar may include a clip portion clipping a front hem of the shading sheet along an entire length of the pull bar, and a bottom wall below the clip portion. While having a front end retained by the clip portion, the shading sheet can wrapped around the pull bar such that the shading sheet sequentially passes over an upper surface and a front surface of the clip portion and then continues along the bottom wall.

5 Claims, 6 Drawing Sheets

SHADE ROLLER APPARATUS

CROSS-REFERENCE TO RELATED APPLICATIONS

This application is a U.S. national phase application filed under 35 U.S.C. § 371 of International Application No. PCT/EP2018/072541, filed 21 Aug. 2018, designating the United States, which claims priority from Japan Patent Application No. 2017-167071, filed 31 Aug. 2017, which are hereby incorporated herein by reference in their entirety for all purposes.

TECHNICAL FIELD

The present disclosure relates to a shade roller apparatus configured to shade a window formed at a roof of a vehicle, and particularly relates to a structure of a portion where a pull bar is attached to a shading sheet.

BACKGROUND ART

Typically, in a vehicle configured such that a window is formed at a roof, a shade roller apparatus configured to shade the window is provided (see, e.g., Patent Document 1). The shade roller apparatus has a shading sheet, a roller around which the shading sheet is rolled, and a pull bar attached to a front end of the shading sheet. The roller is arranged below the window, and is configured so that the shading sheet can be rolled around the roller. The shading sheet is configured to open the window in a state in which the shading sheet is rolled around the roller and to screen the window when the pull bar at the front end is pulled to below a front hem of the window.

The pull bar (100) of the shade roller apparatus of Patent Document 1 is configured as illustrated in FIG. 8. The pull bar (100) is formed in such a manner that a front hem of the shading sheet (110) is sewn as French seam (a seam is indicated by a reference numeral (111)) and a spindle (102) is inserted into the shading sheet (110). The pull bar (100) has a sheet holding portion (103) having a C-shaped section, and a bag portion (112) of the shading sheet (110) through which the spindle (102) passes is attached to the sheet holding portion (103). Although not shown in the figure, right and left end portions of the sheet holding portion (103) of the pull bar (100) as an elongated member are swaged, and the position of the pull bar (100) in a width direction with respect to the shading sheet (110) is fixed.

CITATION LIST

Patent Document

PATENT DOCUMENT 1: Japanese Unexamined Patent Publication No. 2002-054369

SUMMARY OF THE INVENTION

Technical Problem

In the above-described typical configuration, the process of sewing the shading sheet (110) is necessary, and the spindle (102) is also necessary for attaching the pull bar (100) to the shading sheet (110). Moreover, it is necessary to swage the right and left end portions of the pull bar (100) for fixing the position of the pull bar (100) in the width direction with respect to the shading sheet (110). Thus, there is a problem that the number of components and processes necessary for firmly attaching the pull bar (100) to the shading sheet (110) are great. For these reasons, it has been demanded that the number of components and processes necessary for attaching the pull bar (100) to the shading sheet (110) are reduced, but instability of the position of the pull bar (100) needs to be avoided.

The present disclosure has been made in view of the above-described problem, and an object of the present disclosure is to stably attach a pull bar to a shading sheet in a shade roller apparatus and reduce the number of components and processes necessary for such attachment as compared to the typical number.

Solution to the Problem

A first aspect of the present disclosure is based on a shade roller apparatus including a shading sheet (51), a roller (60) around which the shading sheet (51) can be rolled and from which the shading sheet (51) can be unrolled, and a pull bar (70) attached to a front hem of the shading sheet (51) in an unrolling direction thereof. The shade roller apparatus is configured to open/close a window (3) formed at a roof (1) of a vehicle with the shade sheet (51).

In the shade roller apparatus, the pull bar (70) includes a clip portion (71) having an upper clip piece (73) and a lower clip piece (74) configured to open/close with one end portions functioning as a pivot (72) to clip the front hem of the shading sheet (51) across the entire length of the pull bar (70), and a bottom wall (75) formed below the clip portion (71). The shading sheet (51) is rolled around the pull bar (70) along the upper clip piece (73), the pivot (72), and the bottom wall (75) in a state in which a tip end portion of the shading sheet (51) is held at the clip portion (71), and extends to the roller (60).

In the first aspect of the present disclosure, the shading sheet (51) whose tip end portion is held at the clip portion (71) is rolled around the pull bar (70) along the upper clip piece (73), the pivot (72), and the bottom wall (75) (see FIG. 4). Thus, when tension is on the shading sheet (51), the effect of pressing the upper clip piece (73) against the lower clip piece (74) by the shading sheet (51) is generated. Thus, the shading sheet (51) is firmly sandwiched between the upper clip piece (73) and the lower clip piece (74).

A second aspect of the present disclosure is the shade roller apparatus of the first aspect of the present disclosure, in which the pull bar (70) includes a retaining piece (74a) configured to hold the shading sheet (51) between the retaining part (74a) and a tip end portion (73a) of the upper clip part (73) in a state in which the upper clip piece (73) is closed.

In the second aspect of the present disclosure, the shading sheet (51) is held with the shading sheet (51) being sandwiched between the upper clip piece (73) and the lower clip piece (74), and is also held with the shading sheet (51) being sandwiched between the tip end portion (73a) of the upper clip piece (73) and the retaining piece (74a).

A third aspect of the present disclosure is the shade roller apparatus of the second aspect of the present disclosure, in which meshing portions (77) meshing each other to sandwich the shading sheet (51) are formed at opposing surfaces of the upper clip piece (73) and the lower clip piece (74).

In the third aspect of the present disclosure, the shading sheet (51) is sandwiched between the meshing portions formed at the opposing surfaces of the upper clip piece (73) and the lower clip piece (74). Thus, the shading sheet (51) is firmly held at the clip portion (71).

A fourth aspect of the present disclosure is the shade roller apparatus of any one of the first to third aspects of the present disclosure, in which the clip portion (71) has such dimensions that the clip portion (71) compresses and clips the shading sheet (51).

In the fourth aspect of the present disclosure, the shading sheet (51) is held with the shading sheet (51) being compressed by the clip portion (71). In this state, the upper clip piece (73) is pressed against the lower clip piece (74) by the shading sheet (51) (see FIG. 4). Thus, the shading sheet (51) is more firmly sandwiched between the upper clip piece (73) and the lower clip piece (74).

A fifth aspect of the present disclosure is the shade roller apparatus of any one of the first to fourth aspects of the present disclosure, in which the bottom wall (75) has, at an end portion close to the pivot (72), a curved portion (75a) curved toward the pivot (72) and the pivot (72) projects with respect to the curved portion (75a) in a pulling direction of the pull bar (70).

In the fifth aspect of the present disclosure, the curved portion (75a) is formed at the bottom wall (75) of the pull bar (70), and the shade roller apparatus is provided above a passenger of the vehicle. Thus, the shading sheet (51) is opened/closed in a state in which the curved portion (75a) of the pull bar (70) is positioned in a direction facing the passenger.

Advantages of the Invention

According to the present disclosure, the shading sheet (51) whose tip end portion is held at the clip portion (71) is rolled around the pull bar (70) along the upper clip piece (73), the pivot (72), and the bottom wall (75) (see FIG. 4). Thus, when tension is on the shading sheet (51), the effect of pressing the upper clip piece (73) against the lower clip piece (74) by the shading sheet (51) is generated. Thus, the shading sheet (51) is firmly sandwiched between the upper clip piece (73) and the lower clip piece (74) in a state in which strong friction force between the shading sheet (51) and the clip piece is generated. Thus, the pull bar (70) can be stably attached to the shading sheet (51).

Moreover, according to the present disclosure, the pull bar (70) is attached to the shading sheet (51), and therefore, a typical member such as a spindle is not necessary. The process of sewing the shading sheet (51) or swaging the pull bar (70) is not necessary. Thus, the number of components and the number of processes necessary for attachment can be reduced as compared to the typical numbers. Further, the pull bar (70) is firmly held at the shading sheet (51), and therefore, a problem that the shading sheet (51) is wrinkled due to position shift between the shading sheet (51) and the pull bar (70) can be reduced.

According to the above-described second aspect of the present disclosure, the shading sheet (51) is held with the shading sheet (51) being sandwiched between the upper clip piece (73) and the lower clip piece (74). In addition, the shading sheet (51) is also held with the shading sheet (51) being sandwiched between the tip end portion (73a) of the upper clip piece (73) and the retaining piece (74a). Thus, the contact area of a portion where the shading sheet (51) is held by the clip portion (71) is large. Consequently, the shading sheet (51) is less detached from the pull bar (70) even when the shading sheet (51) is unrolled, and conversely, the pull bar (70) is stably attached to the shading sheet (51).

According to the above-described third aspect of the present disclosure, the meshing portions (77) meshing each other to sandwich the shading sheet (51) are formed at the opposing surfaces of the upper clip piece (73) and the lower clip piece (74), and therefore, the shading sheet (51) is firmly held by the clip portion (71). Thus, the pull bar (70) can be stably attached by the shading sheet (51).

According to the above-described fourth aspect of the present disclosure, the dimensions of the clip portion (71) are configured such that the shading sheet (51) is compressed and clipped, and the shading sheet (51) is more firmly sandwiched between the upper clip piece (73) and the lower clip piece (74). Thus, stability in attachment of the pull bar (70) to the shading sheet (51) is enhanced.

According to the above-described fifth aspect of the present disclosure, the curved portion (75a) is formed at the bottom wall (75) of the pull bar (70), and the shade roller apparatus is provided above the passenger of the vehicle. Thus, the shading sheet (51) is opened/closed in a state in which the curved portion (75a) of the pull bar (70) is positioned in the direction facing the passenger. Thus, a portion where the pull bar (70) might contact the passenger upon advancing/retreating is the curved portion (75a). Even upon contact with the passenger, e.g., a problem in the case of contact with a corner portion can be reduced. Moreover, in this aspect of the present disclosure, the curved portion (75a) of the bottom wall (75) and the clip portion (71) are separated in the upper-to-lower direction, and therefore, a space is formed therebetween. Such a space is closed by the shading sheet (51), and therefore, there is no design problem.

DESCRIPTION OF EMBODIMENTS

Hereinafter, an embodiment of the present disclosure will be described in detail with reference to the drawings. The present embodiment is an example where a shade roller apparatus (50) of the present disclosure is incorporated into a sunroof apparatus (10) attached to a roof (1) of a vehicle. Note that the following description of a preferable embodiment will be merely an example in nature, and is not intended to limit the present disclosure, applications of the present disclosure, and use of the present disclosure.

Figure 1:
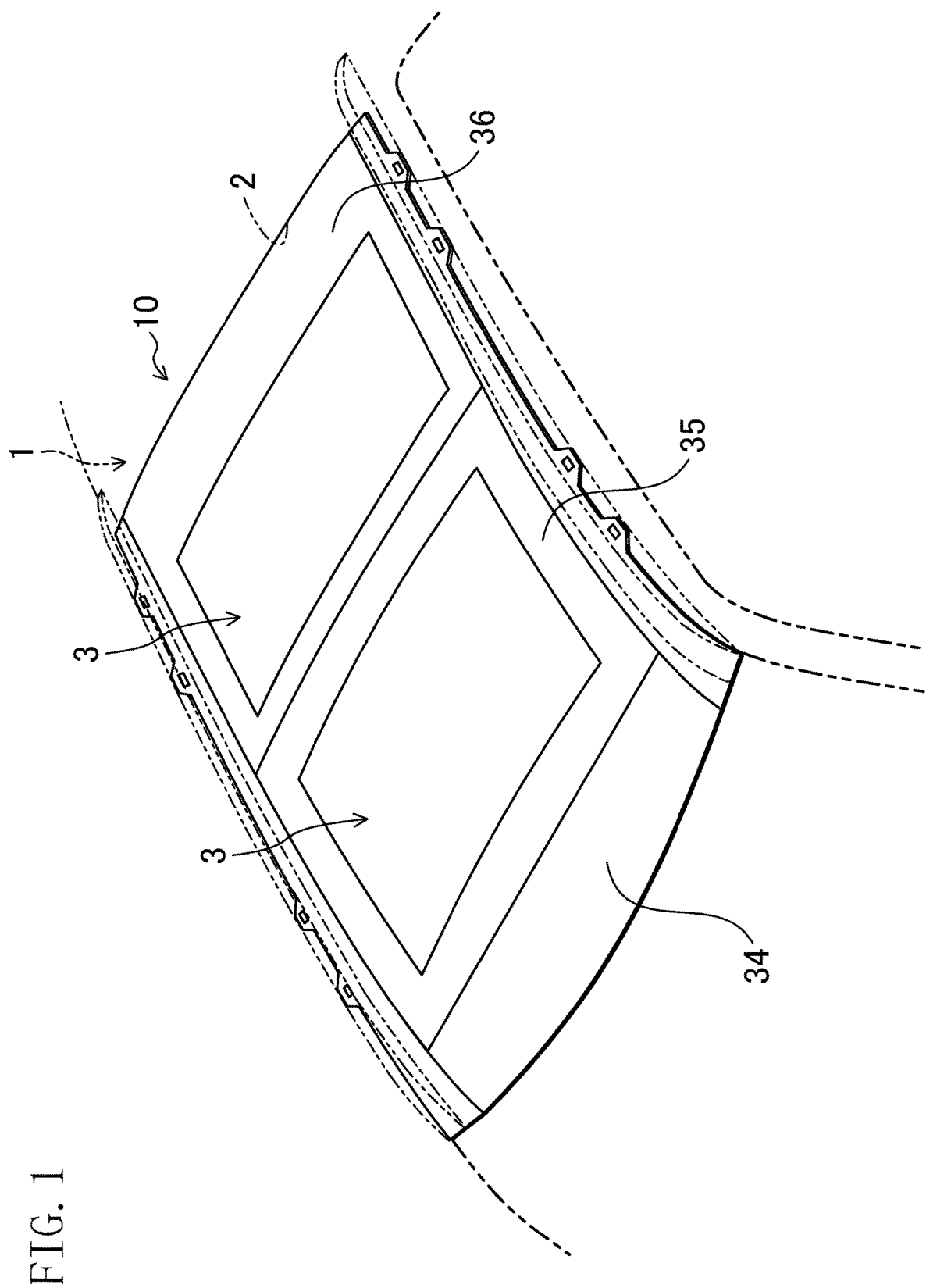
FIG. 1 is a perspective view of a sunroof apparatus of an embodiment of the present disclosure in a fully-closed state.
Figure 2:
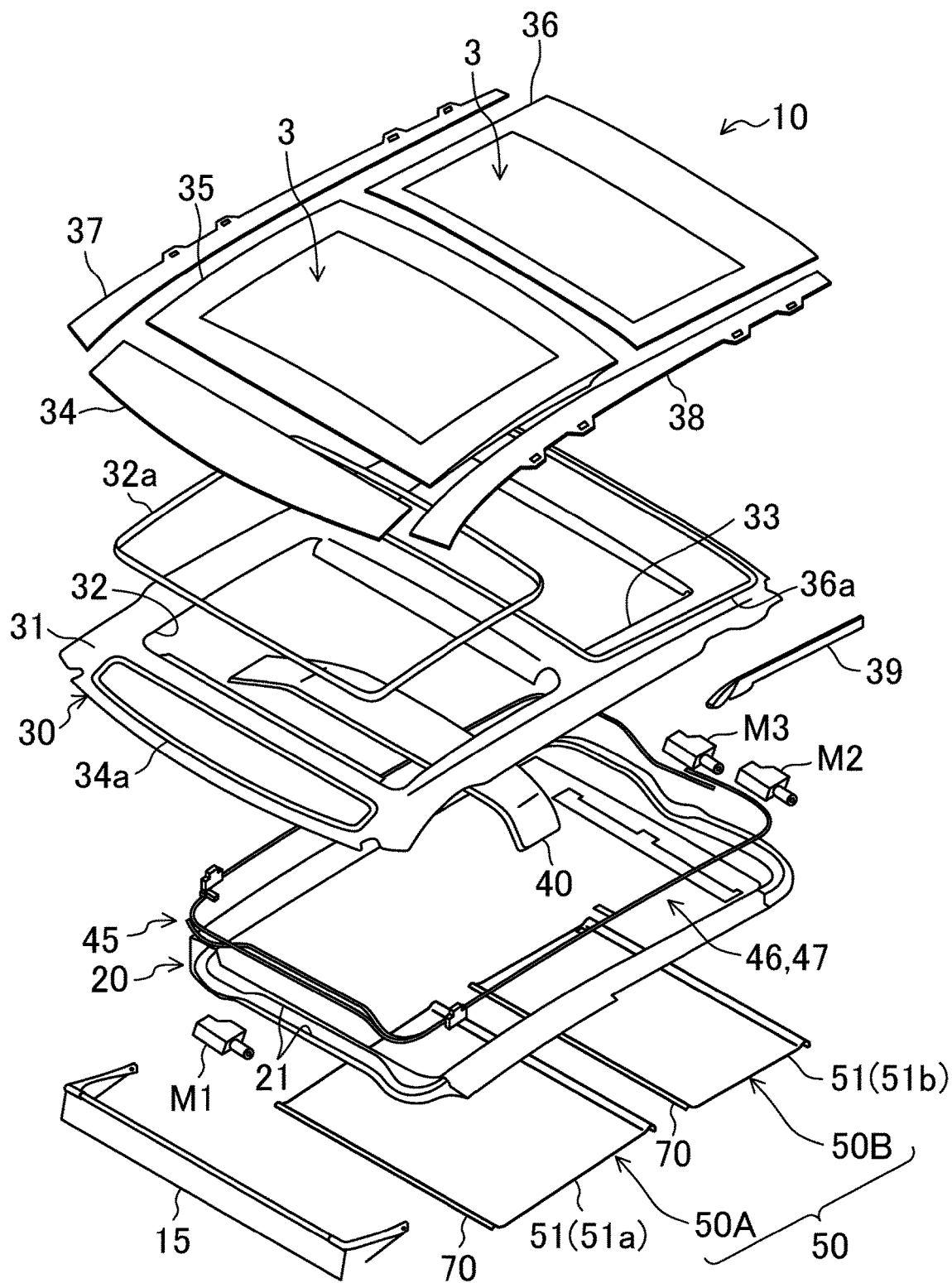
FIG. 2 is an exploded perspective view of the sunroof apparatus of the embodiment.

FIG. 1 is a perspective view of the sunroof apparatus (10) in a fully-closed state, and FIG. 2 is an exploded perspective view of the sunroof apparatus (10). Note that for the sake of convenience in description, a front side in a vehicle front-to-rear direction will be, in the present specification, referred to as a "front," and a rear side will be referred to as a "rear."

A left side in a vehicle width direction will be referred to as a "left (L)," and a right side will be referred to as a "right (R)."

<Outline Configuration of Sunroof Apparatus>

The sunroof apparatus (10) is placed at an opening (2) formed at the roof (1) of the vehicle. As illustrated in FIG. 2, the sunroof apparatus (10) has a frame assembly (20) including multiple aluminum components, and a reinforced-plastic housing (30) attached to the frame assembly (20) from above. The frame assembly (20) is a frame-shaped member, and the housing (30) is a member configured such that openings (32, 33) are formed at the front and rear sides of a housing base material (31). The frame assembly (20) is attached below the housing (30), and a reinforcement member (40) extending in the right-to-left direction is attached below the frame assembly (20).

Three glass panels (a front-side fixed glass panel (34), a movable glass panel (35), and a rear-side fixed glass panel (36)) and side fins (37, 38) positioned on the right and left sides of each glass panel are attached to an upper surface of the housing base material (31).

The front-side fixed glass panel (34) is fixed to a front end portion of the housing base material (31) through a seal material (34a). The movable glass panel (35) is attached to the frame assembly (20) to advance/retreat in the front-to-rear direction. The rear-side fixed glass panel (36) is arranged to cover the rear-side opening (33) of the housing (30) through a seal material (36a). An outer rail (39) is, as a guide upon advancing/retreating of the movable glass panel, provided between the housing base material (31) and each of the right and left side fins (37, 38).

The front-side fixed glass panel (34) is a panel made of so-called smoked glass. Similarly, the movable glass panel (35) and the rear-side fixed glass panel (36) are also panels made of smoked glass and exhibiting translucency, and form a window (3) of the roof of the vehicle.

The shade roller apparatus (50) having a shading sheet (51) capable of screening the window (3) is provided below the sunroof apparatus (10). The shade roller apparatus (50) includes a front-side shade roller apparatus (50A) and a rear-side shade roller apparatus (50B) so that two shading sheets (51a, 51b) can be separately opened/closed.

The frame assembly (20) is loaded with a pair of push-pull cables (45) coupled to the movable glass panel (35) through a drive mechanism and two pairs of push-pull cables (46, 47) configured to separately drive the front-side and rear-side shade roller apparatuses (50A, 50B). At the frame assembly (20), a cable groove (21) configured such that each push-pull cable (45, 46, 47) is loaded in the cable groove (21) is formed.

A single front-side motor (M1) and two rear-side motors (M2, M3) are attached to a lower surface of the housing (30). The front-side motor (M1) meshes with the push-pull cables (45) configured to drive the front-side shade roller apparatus (50A). The rear-side motors (M2, M3) are coupled to the movable glass panel (35) and the rear-side shade roller apparatus (50B) through the push-pull cables (46, 47).

A weather strip (32a) is attached to the edge of the front-side opening (32) of the housing base material (31). In a closed state, the movable glass panel (35) closely contacts the weather strip (32a), thereby screening the front-side opening (32) of the housing base material (31). A deflector (15) is provided on a front end side of the front-side opening (32) of the housing base material (31). The deflector (15) is housed between the movable glass panel (35) and the housing base material (31) at a position at which the movable glass panel (35) closes the opening, and stands to serve as protection against wind when the movable glass panel (35) retreats to open the opening (32).

<Shade Roller Apparatus>

Figure 3:
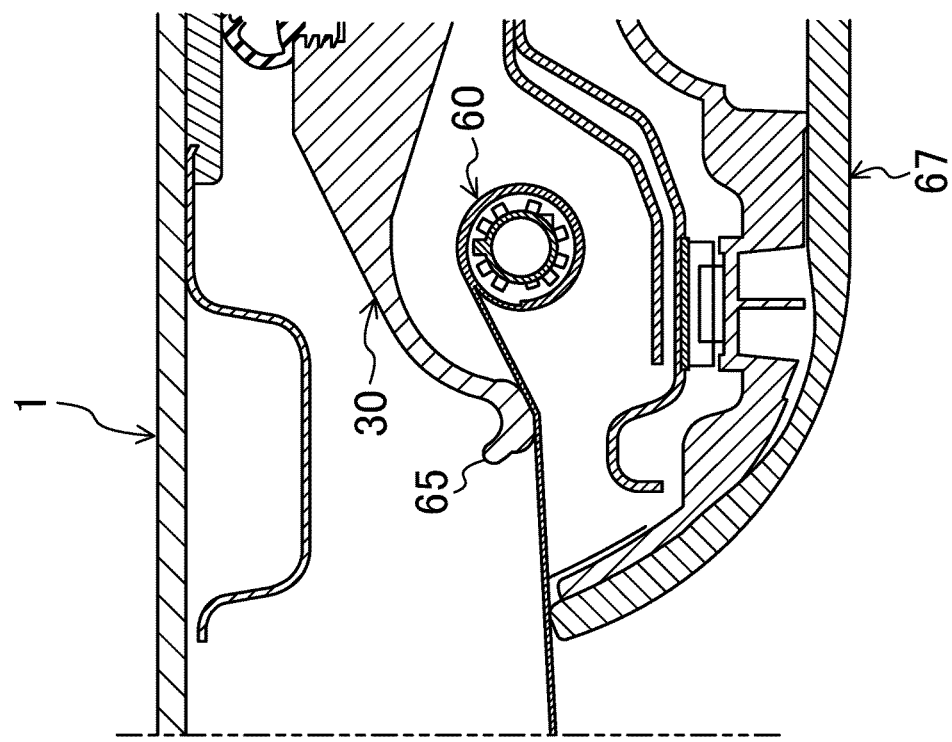
FIG. 3 is a sectional view of a configuration of front and rear end portions of a front-side shade roller apparatus of the embodiment.
Figure 3:
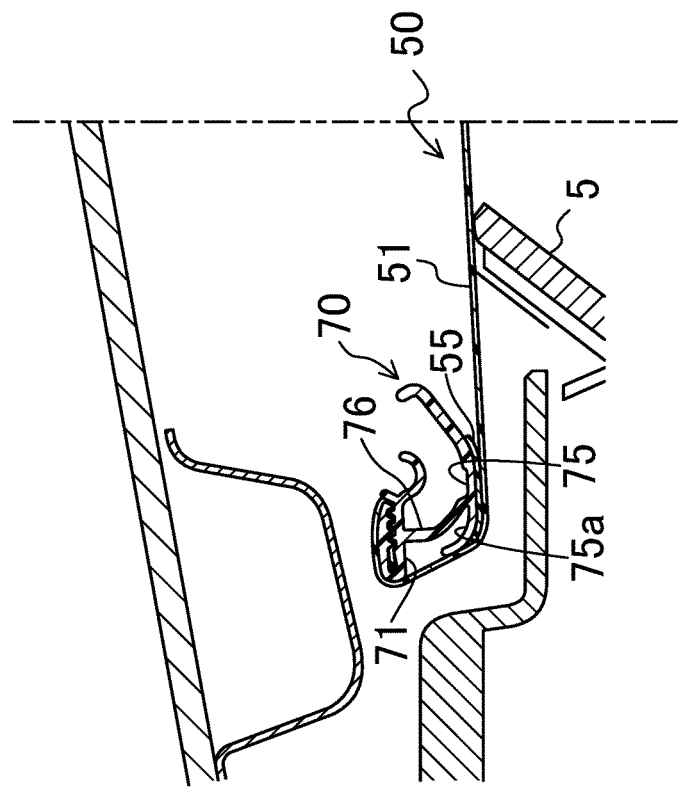

The shade roller apparatus (50) is provided at such a position that the window (3) formed at the roof (1) of the vehicle is opened/closed by the shading sheets (51a, 51b), and as described above, includes the front-side shade roller apparatus (50A) and the rear-side shade roller apparatus (50B). FIG. 3 is a sectional view of a configuration of front and rear end portions of the front-side shade roller apparatus (50A). A common basic structure is employed for the front-side shade roller apparatus (50A) and the rear-side shade roller apparatus (50B). Thus, the front-side shade roller apparatus (50A) (hereinafter merely referred to as the "shade roller apparatus (50)") will be described below.

The shade roller apparatus (50) includes the shading sheet (51), a roller (60) around which the shading sheet (51) can be rolled and from which the shading sheet (51) can be unrolled, a pull bar (70) attached to a front hem of the shading sheet (51) in an unrolling direction thereof. FIG. 3 illustrates a shading state of the shade roller apparatus (50) when the shading sheet (51) is unrolled forward from the roller (60) and the pull bar (70) is positioned at a front end of a movable area.

In the shading state illustrated in FIG. 3, the shade roller apparatus (50) is configured such that the shading sheet (51) contacts an upper end of a head lining (5). The shading sheet (51) contacts the upper end of the head lining (5) in the shading state, and therefore, leakage of external light from the outside to the inside of a vehicle compartment is reduced.

The shading sheet (51) is, on a rear end side thereof, pressed from above by a pressing portion (65) of the housing (30) in the vicinity of the roller (60). The roller (60) is, from below, covered with a head lining (67).

Figure 4:
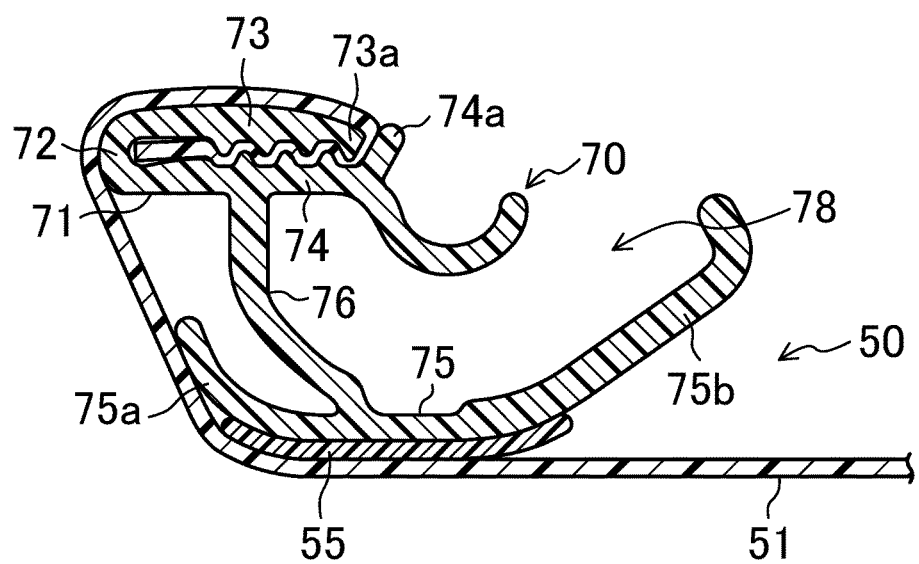
FIG. 4 is an enlarged sectional view of a structure of a pull bar of the embodiment.

As illustrated in FIG. 2, the pull bar (70) is an elongated member extending across the substantially entire width of the shading sheet (51). Moreover, as illustrated in FIG. 4 as an enlarged sectional view, the pull bar (70) includes a clip portion (a sheet holding portion) (71) configured to clip the front hem of the shading sheet (51) across the entire length of the pull bar (70), a bottom wall (75) formed below the clip portion (71), and a leg portion (76) positioned between the clip portion (71) and the bottom wall (75) and configured to connect the clip portion (71) and the bottom wall (75).

The clip portion (71) has an upper clip piece (73) and a lower clip piece (74) configured to open/close with one end portions thereof functioning as a pivot (72). In a state in which the upper clip piece (73) is closed, the pull bar (70) has a retaining piece (74a) configured to hold the shading sheet (51) between the retaining piece (74a) and a tip end portion (73a) of the upper clip piece (73). The retaining piece (74a) is formed as part of the lower clip piece (74).

Figure 6:
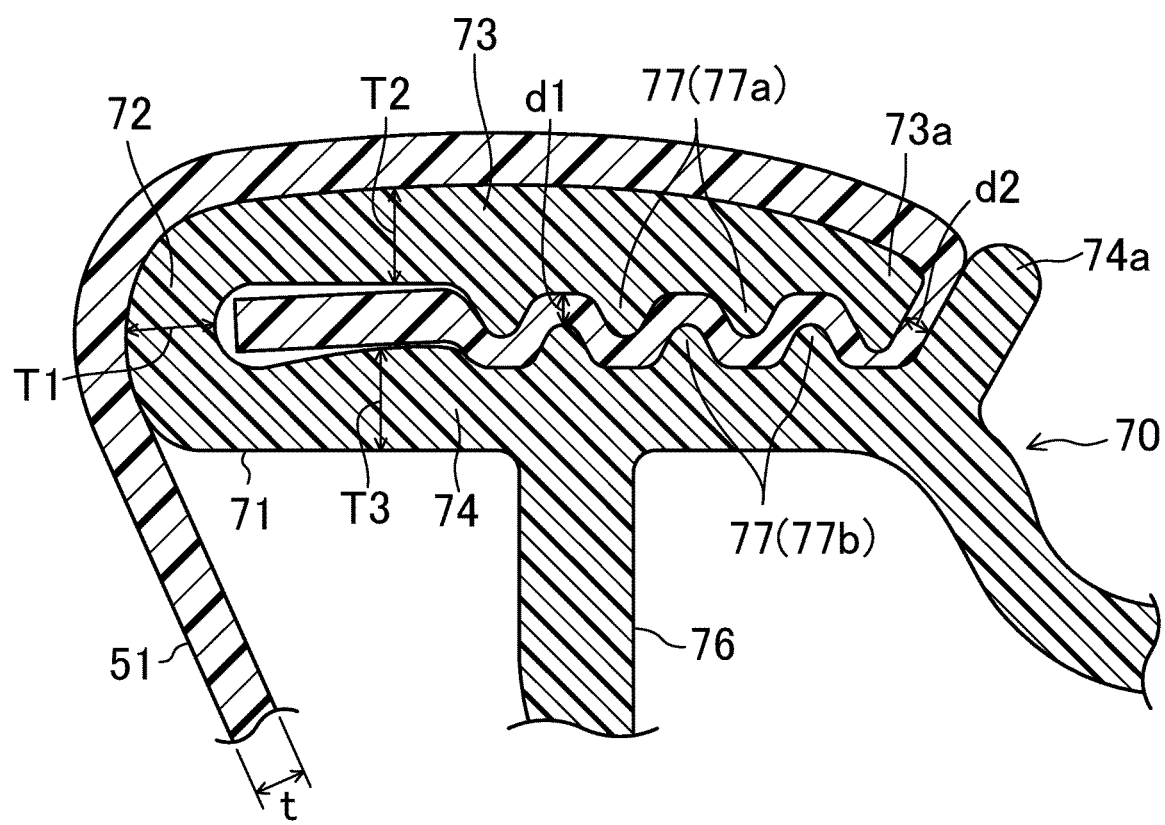
FIG. 6 is an enlarged sectional view of a main portion of the pull bar of the embodiment.

As illustrated in FIG. 6 as an enlarged sectional view of a main portion of the pull bar (70), meshing portions (77) meshing each other to sandwich the shading sheet are formed at opposing surfaces of the upper clip piece (73) and the lower clip piece (74).

The meshing portions (77) include an upper meshing portion (77a) formed at the upper clip piece (73), and a lower meshing portion (77b) formed at the lower clip piece (74). Moreover, the pull bar (70) has such a sectional shape that the thickness (T1) of the pivot (72) is less than the thicknesses (T2, T3) of the upper clip piece (73) and the lower clip piece (74). It is configured such that the upper clip piece (73) and the lower clip piece (74) do not deform upon later-described pressing for fixing the shading sheet (51)

with the shading sheet (51) being sandwiched between the upper clip piece (73) and the lower clip piece (74) and spring back of the pivot (72) after pressing is small. Moreover, an upper surface of the upper clip piece (73) is curved in an arch shape, and the upper clip piece (73) has a sufficient thickness.

A clearance dimension (d1) between both meshing portions (77a, 77b) is less than the thickness dimension (t) of the shading sheet (51), and is configured such that the clip portion (71) compresses and clips the shading sheet (51). Moreover, a clearance dimension (d2) between the tip end portion (73a) of the upper clip piece (73) and the retaining piece (74a) is also less than the thickness dimension (t) of the shading sheet (51), and at such a portion, is also configured such that the clip portion (71) compresses and clips the shading sheet (51).

Figure 7:
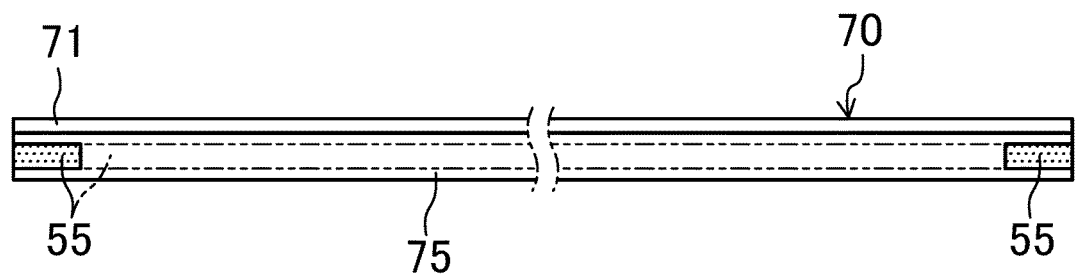
FIG. 7 is a bottom view of the pull bar of the embodiment.
Figure 8:
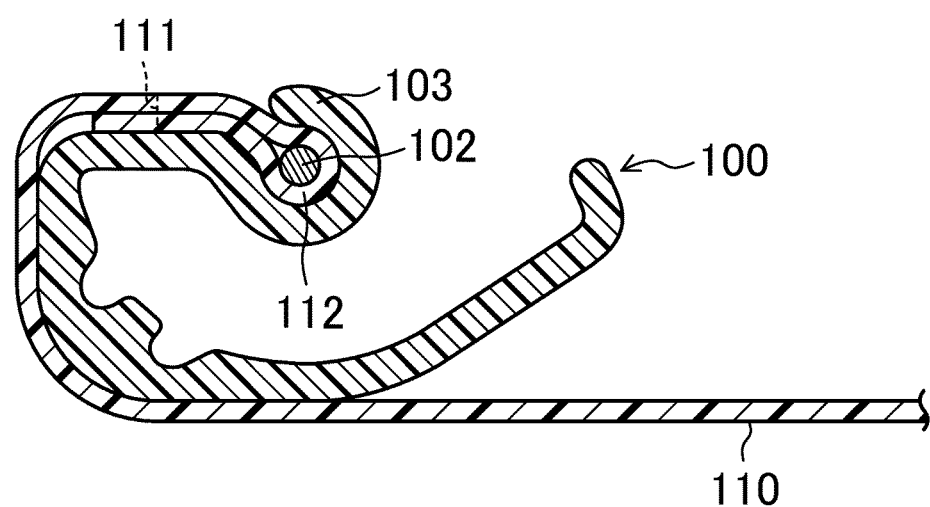
FIG. 8 is an enlarged sectional view of a typical pull bar.

The bottom wall (75) is formed across the entire length of the pull bar (70) below the clip portion (71) in FIG. 4. The bottom wall (75) has, at an end portion close to the pivot (72) of the clip portion (71) (in other words, a tip end side (front side) portion with respect to the leg portion (76)), a curved portion (75a) curved upward to the pivot (72). Moreover, elastic pads (55) made of a material (e.g., an EPDM-based rubber sponge such as ethylene or propylene) exhibiting more elasticity than the pull bar (70) are provided between the bottom wall (75) and the shading sheet (51). As illustrated in FIG. 7 as a bottom view of the pull bar (70), the elastic pads (55) are each provided at at least both end portions of the pull bar (70). Moreover, the bottom wall (75) has, at a portion at the rear of the leg portion (76), a holding piece (75b) forming a holding space (78) where a connector (not shown) coupled to the push-pull cables (46).

The pivot (72) projects beyond the curved portion (75a) in a pulling direction (the left direction of FIG. 4) of the pull bar (70). That is, in FIG. 5, a point P1 as a front-side tip end of the pivot (72) projects toward the front side of the vehicle with respect to a point P2 as a front-side tip end of the curved portion (75a).

Figure 5:
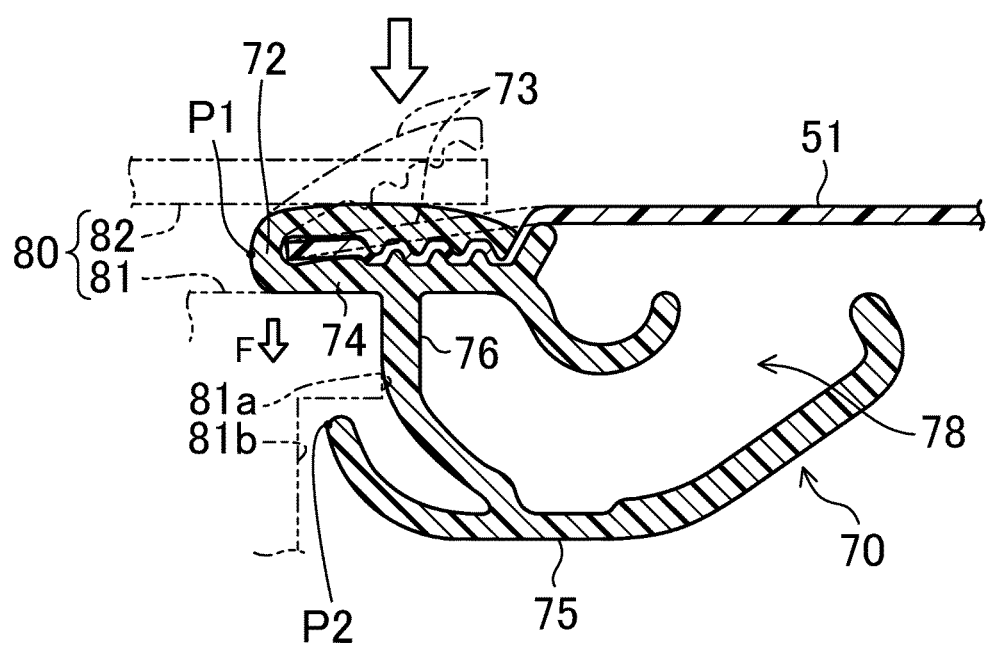
FIG. 5 is a view of the step of pressing a shading sheet with the shading sheet being clipped by the pull bar of the embodiment.

As illustrated in FIG. 5, the pull bar (70) is attached to the shading sheet (51) in such a manner that a tip end portion of the shading sheet (51) is clipped by the clip portion (71) of the pull bar (70). In this state, the lower clip piece (74) is supported by a support portion (81) of a press apparatus (80) while the upper clip piece (73) is being pressed by a pressing portion (82) of the press apparatus (80). The support portion (81) is formed such that a base portion (81b) is positioned in the vicinity of the tip end of the curved portion (75a) in a state in which a top portion (81a) substantially contacts with the leg portion (76), and therefore, the base portion (81b) reliably receives force F acting on the clip portion (71) upon pressing. Thus, the press force is reliably transmitted to the pivot (72), and the clip portion (71) deforms from a state indicated by a virtual line of FIG. 5 to a state indicated by a solid line. Moreover, spring back is reduced as described above.

Thereafter, the shading sheet (51) is rolled back around the pull bar (70) along the upper surface of the upper clip piece (73), the pivot (72), and the bottom wall (75), and therefore, is brought into the state of FIG. 4. In this state, the shade roller apparatus (50) is assembled with the sunroof apparatus (10).

Operation of Shade Roller Apparatus

In the shade roller apparatus (50) of this embodiment, when a front shading sheet switch (not shown) provided at, e.g., a driver's seat is operated to drive the motor (M1), the shading sheet (51a) of the front-side shade roller apparatus (50A) is opened/closed. Moreover, when a rear shading sheet switch (not shown) is operated to drive the motor (M3), the shading sheet (51b) of the rear-side shade roller apparatus (50B) is opened/closed. The elastic pad (55) is provided on the back side of the shading sheet (51a, 51b). Thus, when the shading sheet (51a, 51b) is opened/closed, force generated due to friction between the head lining (5) and the shading sheet (51a, 51b) is absorbed by the elastic pad (55).

Advantageous Effects of the Embodiment

According to the present embodiment, the shading sheet (51) whose tip end portion is held at the clip portion (71) is, as illustrated in FIG. 4, rolled around the pull bar (70) along the upper clip piece (73), the pivot (72), and the bottom wall (75), and therefore, the effect of pushing the upper clip piece (73) against the lower clip piece (74) by the shading sheet (51) is generated. In addition, the dimensions of the clip portion (71) are configured to press and clip the shading sheet (51). Thus, in a state in which strong friction force is generated between the shading sheet (51) and a clip piece, the shading sheet (51) is firmly sandwiched between the upper clip piece (73) and the lower clip piece (74). Thus, the pull bar (70) can be stably attached to the shading sheet (51).

The shading sheet (51) is held with the shading sheet (51) being sandwiched between the upper clip piece (73) and the lower clip piece (74). In addition, the shading sheet (51) is also held with the shading sheet (51) being sandwiched between the tip end portion (73a) of the upper clip piece (73) and the retaining piece (74a). Thus, the contact area of a portion where the shading sheet (51) is held by the clip portion (71) is large. Consequently, the shading sheet (51) is less detached from the pull bar (70) even when the shading sheet (51) is unrolled, and the pull bar (70) is stably attached to the shading sheet (51).

Further, according to the present embodiment, the meshing portions (77) meshing each other to sandwich the shading sheet (51) are formed at the opposing surfaces of the upper clip piece (73) and the lower clip piece (74), and therefore, the shading sheet (51) is firmly held by the clip portion (71). Thus, the meshing portions (77) also contribute to stable attachment of the pull bar (70) to the shading sheet (51).

In addition, according to the present embodiment, the pull bar (70) is attached to the shading sheet (51), and therefore, a member such as a spindle used typically is not necessary. The process of sewing the shading sheet (51) or swaging the pull bar (70) is not necessary. Thus, the number of components and the number of processes necessary for attachment can be reduced as compared to the typical numbers.

Moreover, according to the present embodiment, the pull bar (70) is firmly held at the shading sheet (51), and therefore, a problem that the shading sheet (51) is wrinkled due to position shift between the shading sheet (51) and the pull bar (70) can be reduced.

Further, according to the present embodiment, the curved portion (75a) is formed at the bottom wall (75) of the pull bar (70), and the shade roller apparatus is provided above a passenger of the vehicle. Thus, the shading sheet (51) is opened/closed in a state in which the curved portion (75a) of the pull bar (70) is positioned in a direction facing the passenger. Thus, a portion where the pull bar (70) might contact the passenger is the curved portion (75a). Unlike the case of contact with a corner portion, a problem can be reduced even upon contact with the passenger.

In addition, the space between the curved portion (75a) of the bottom wall (75) and the clip portion (71) is closed by the shading sheet (51), and therefore, there is no design problem due to separation of the clip portion (71) and the curved portion (75*a*) in the upper-to-lower direction.

Variation of the Embodiment

In the above-described embodiment, the elastic pads (55) are each provided at both end portions of the pull bar (70). However, as indicated by a virtual line in FIG. 7, the elastic pad (55) may be provided across the entire length of the pull bar (70). With this configuration, wear of the shading sheet (51) due to contact with the head lining (5) can be reduced across a wider portion.

Other Embodiments

The above-described embodiment may have the following configurations.

For example, in the above-described embodiment, the example where the shade roller apparatus (50) is incorporated into the sunroof apparatus (10) of the vehicle has been described. However, the shade roller apparatus of the present disclosure is not necessarily incorporated into the sunroof apparatus (10), and is applicable to a vehicle configured such that a window (3) is formed at a roof.

Moreover, the meshing portions (77*a*, 77*b*) may be, for example, a combination of recessed and raised portions engaging each other and having a tooth-shaped sectional shape, or may be a combination of dimple-shaped recessed and raised portions. In other words, as long as the surface area of a portion where the shading sheet (51) is clipped and held is large, the shape of the meshing portion (77*a*, 77*b*) may be changed as necessary. Note that in a case where the shading sheet (51) can be firmly held without the meshing portions (77*a*, 77*b*), the meshing portions (77*a*, 77*b*) are not necessarily provided.

Further, as long as it is configured such that the shading sheet (51) held at the clip portion (71) is rolled around the upper clip piece (73) of the pull bar (70), the pivot (72), and the bottom wall (75) and the clip portion (71) is firmly fastened, other configurations may be changed as necessary in the present disclosure.

INDUSTRIAL APPLICABILITY

As described above, the present disclosure is useful for the structure of the portion where the pull bar is attached to the shading sheet in the shade roller apparatus configured to shade the window formed at the roof of the vehicle.

DESCRIPTION OF REFERENCE CHARACTERS

1 Roof
3 Window
50 Shade Roller Apparatus
51 Shading Sheet
60 Roller
70 Pull Bar
71 Clip Portion
72 Pivot
73 Upper Clip Piece
74 Lower Clip Piece
74*a* Retaining Piece
75 Bottom Wall
75*a* Curved Portion
77 Meshing Portion

The invention claimed is:

1. A shade roller apparatus comprising:
a shading sheet;
a roller around which the shading sheet can be rolled and from which the shading sheet can be unrolled; and
a pull bar attached to a front edge of the shading sheet, the front edge located forward in a direction in which the shading sheet is unrolled,
the shade roller apparatus configured to open and close a window provided in a roof of a vehicle with the shade sheet,
wherein the pull bar includes a clip portion and a bottom wall below the clip portion,
the clip portion includes an upper clip part and a lower clip part which are opened and closed with an end of each of the upper and lower clip parts functioning as a living hinge pivot, such that the upper and lower clip parts clip the front edge of the shading sheet therebetween along an entire length of the pull bar, and
while having a front end retained by the clip portion, the shading sheet is wrapped around the pull bar such that the shading sheet continues along the upper clip part, the pivot, and the bottom wall, and then extends to the roller.

2. The shade roller apparatus of claim 1, wherein the pull bar includes a retaining part which is configured to hold and retain the shading sheet between the retaining part and a tip end of the upper clip part while the upper clip part is in a closed state.

3. The shade roller apparatus of claim 2, wherein the upper clip part has a meshing portion on a surface facing a surface of the lower clip part, and the lower clip part has another meshing portion on the surface facing the surface of the upper clip part, and the meshing portions mesh with each other to pinch the shading sheet between the meshing portions.

4. The shade roller apparatus of claim 1, wherein the clip portion has such dimensions that the clip portion clips and compresses the shading sheet.

5. The shade roller apparatus of claim 1, wherein the bottom wall has, in an end portion close to the pivot, a curved portion which is curved toward the pivot, and the pivot projects forward with respect to the curved portion in a direction in which the pull bar is pulled.

* * * * *